(12) United States Patent
Creasey

(10) Patent No.: US 7,648,643 B1
(45) Date of Patent: *Jan. 19, 2010

(54) METAL RECOVERY PROCESS AND METHOD

(75) Inventor: David H Creasey, Boerne, TX (US)

(73) Assignee: Phitex, L.L.L.P., Cocoa, FL (US)

( * ) Notice: Subject to any disclaimer, the term of this patent is extended or adjusted under 35 U.S.C. 154(b) by 85 days.

This patent is subject to a terminal disclaimer.

(21) Appl. No.: 11/765,868

(22) Filed: Jun. 20, 2007

Related U.S. Application Data

(60) Provisional application No. 60/815,500, filed on Jun. 21, 2006.

(51) Int. Cl.
*C09K 3/00* (2006.01)

(52) U.S. Cl. .............................. 252/183.11; 252/183.14

(58) Field of Classification Search ............ 252/183.11, 252/183.14
See application file for complete search history.

(56) References Cited

U.S. PATENT DOCUMENTS

| | | | |
|---|---|---|---|
| 5,205,858 A | 4/1993 | Manke | |
| 5,232,490 A | 8/1993 | Bender et al. | |
| 5,989,595 A * | 11/1999 | Cummins | 424/710 |
| 6,242,011 B1 * | 6/2001 | Cummins | 424/710 |
| 6,972,107 B2 | 12/2005 | Marsden et al. | |
| 7,192,618 B2 * | 3/2007 | Cummins et al. | 426/321 |
| 2003/0039605 A1 | 2/2003 | Ramsay | |
| 2005/0191394 A1 * | 9/2005 | Cummins et al. | 426/335 |

* cited by examiner

*Primary Examiner*—Jerry Lorengo
*Assistant Examiner*—Jared Wood
(74) *Attorney, Agent, or Firm*—Brian S. Steinberger; Joyce P. Morlin; Law Offices of Brian S. Steinberger, P.A.

(57) ABSTRACT

A process and composition of matter for the recovery of metal from a metal-laden ore, soil or rock is provided. A liquid, non-toxic, low pH acidic composition is used as a chelating agent that extracts the metal into a pregnant liquid solution. The pregnant solution is treated by known conventional means, such as filtration, centrifuging, or electrolysis to remove the extracted metals. The low pH, acidic composition (LpHAC) does not have any known toxicity to man or the environment and performs as an ideal fluidized reaction metal extractant. As a metal extracting agent, it effectively and efficiently extracts gold and other metals from ore laden soil or rock with no environmental and negative health impact.

4 Claims, 3 Drawing Sheets

METAL RECOVERY PROCESS AND METHOD

This invention claims benefit of priority from the U.S. Provisional Patent Application Ser. No. 60/815,500 filed on Jun. 21, 2006 the content of which is incorporated herein by reference.

FIELD OF THE INVENTION

The present invention relates generally to a process and composition effective for extracting metals, and more specifically to, a process for using a non-toxic, high strength, low pH acid composition in a fluidized reaction extraction of metals directly from ore, soil or rock.

BACKGROUND AND PRIOR ART

Most metals occur in nature in oxidized form in their ores and thus must be reduced to their metallic forms. The ore is dissolved following some preprocessing in an aqueous electrolyte or in a molten salt and the resulting solution is electrolyzed. The metal is deposited on the cathode (either in solid or in liquid form), while the anodic reaction is usually oxygen evolution.

Several metals are naturally present as metal sulfides; these include copper, lead, molybdenum, cadmium, nickel, silver, cobalt and zinc. In addition, gold and platinum group metals are associated with sulfide base metal ores. Most metal sulfides, or their salts, are electrically conductive and this allows electrochemical redox reactions to efficiently occur in the molten state or in aqueous solutions. Thus, industrial electrolytic processes have developed and have been used for over one hundred fifty years to obtain elemental metal from a molten ore or an ore in an aqueous solution.

Molten ores are formed in smelting furnaces that reach very high temperatures and require excessive amounts of fuel and energy, so most metal recovery processes use aqueous solution extraction. Unfortunately, the aqueous extraction solutions usually contain toxic, caustic and harsh chemicals, such as cyanide, hydrochloric acid, sulfuric acid that form water soluble complexes with metals.

Within the past fifty years, cyanide has remained one of the most common reactants in the processes for recovery of metals from ore. Cyanide has the great ability to form water soluble complexes with metals. It achieves this via the fact that the cyanide molecule has what is called a triple bond between the carbon and nitrogen atoms. This special bond makes the cyanide molecule very reactive and it easily forms cyano-metallic complexes such as potassium gold cyanide ($KAu(CN)_2$), sodium zinc cyanide ($Na_2Zn(CN)_4$) and sodium copper cyanide ($Na_3Cu(CN)_4$).

Hydrogen cyanide (HCN) is converted to sodium cyanide (NaCN) for mining purposes and shipped to the mine site, usually in briquette form. The solid cyanide briquettes are added to a tanked mixture of finely crushed ore and water let stir for a period of many hours. The solid cyanide dissolves in the water portion of the mixture, attacks or leaches the metal in the ore, and forms the water soluble complex. Thus, the metal has been extracted from a solid state (in the ore) to a liquid state (in the solution).

After a metal has been put in solution or liquefied, it is subjected to electrowinning, also called electrorefining or electroextraction. Electrowinning is the electrodeposition of metals from their ores onto a plate; this is an important technique that allows purification of a non-ferrous metal in an economical and straightforward step.

Various patents claim improvements in metal recovery and electrorefining processes developed since 1865 when a commercial process for electrolytic copper refining was patented by James Elkington.

U.S. Pat. No. 5,232,490 to Bender et al. uses an oxidation/reduction process for recovery of precious metals, such as silver and gold, from manganese dioxide ores, sulfidic ores and carbonaceous materials. The process involves teaching the ore with a leach liquor comprising an acid, such as hydrochloric acid (HCl) and sulfuric acid in the presence of a reductant to dissolve the precious metals. Recovery of the dissolved precious metals in the fluid can be by electrolysis.

U.S. Pat. No. 5,205,858 to Manke describes a precious metals recovery process using the standard cyanide-extraction technique together with carbon adsorption to facilitate the recovery.

U.S. Pat. Publ. No. 2003/0039605 A1 to Ramsay discloses a process for recovering precious metals from fine carbon bearing residual amounts of precious metals. The process involves incinerating carbon followed by a method for separating the precious metals from carbon ash; separation could include cyanidation, gravity concentration, smelting, electrowinning and solvent extraction.

U.S. Pat. No. 6,972,107 B2 to Marsden et al. describes a system for direct electrowinning of copper from a leach solution of a copper-containing ore, concentrate, or other copper-bearing material without the use of copper solvent extraction techniques or apparatus.

None of the prior art processes for recovery of metals from ore use a non-toxic, non-caustic composition to extract metal from its ore. All of the processes have complicated, hazardous, costly processing steps. Many of the processes have disastrous consequences to the environment where the processes are performed. There is a need for a non-toxic, environmentally friendly, efficient process for recovering metals from ore that also conserves natural resources. The present invention fulfills this need.

SUMMARY OF THE INVENTION

The first objective of the present invention is to provide a process for extracting metals directly from soil and rock.

The second objective of the present invention is to provide a process for extracting metals from ore at a recovery rate between 75% and 98% of total metal in the ore.

The third objective of the present invention is to provide a process for recovering metals from ore that has no negative environmental impact.

The fourth objective of the present invention is to provide a process for recovering metals from ore that has no harmful health impact on workers.

The fifth objective of the present invention is to provide a continuous process for recovering metals from an ore laden soil or rock.

The preferred metal extracting solution of the present invention is composed of a low pH acidic antimicrobial composition that is used undiluted or mixed with water to form an aqueous solution. The mixing ratio of water to low pH acid (LpHAC) is in a range between approximately 1% to 90% water to approximately 10 to 99% LpHAC. It is also possible to use full strength LpHAC with no water dilution; however for cost advantages, dilution is recommended in a batch metal recovery system and 100% LpHAC is recommended in a continuous, closed loop system, because the liquid is revitalized and recycled.

A preferred process for the recovery of metal from a metal-containing ore or other soil or rock containing metal includes selecting a metal-containing ore, crushing the metal-containing ore to form a micron-sized powder, conveying the powder to a mixing vat, adding an amount of a lixiviant that consists of a liquid, non-toxic, low pH acidic composition (LpHAC) to form a slurry, extracting metals from the slurry to form a pregnant liquid and a solid residue, conveying the pregnant liquid and solid residue to a solid/liquid separator, removing solids from the pregnant liquid and solid residue, directing the pregnant liquid to a metal recovery unit, and collecting a high purity metal.

The preferred process is used in the recovery of metal when the metal-containing ore contains at least one of copper, lead, molybdenum, cadmium, nickel, silver, cobalt, zinc, gold, platinum and aluminum; more preferably, the metal-containing ore contains gold and/or copper.

The preferred process uses a lixiviant that is a liquid, non-toxic, low pH acidic composition prepared by the process of combining a high purity sulfuric acid with water and an ammonium compound, heating the mixture to approximately 140° F. to form mixture (I), placing mixture (I) in a pressurized vessel and heating the mixture to temperatures in a range between approximately 250 F. and 400 F., then, cooling the mixture, after the mixture is cooled, a stabilizing amount of the starting mixture (I) is added.

Another preferred process uses a lixiviant that is a metal extractant wherein LpHAC is in a concentration range of from 100% to 10% and when the concentration of LpHAC is less than 100%, the remainder of the liquid is water; the more preferred lixiviant is 100% LpHAC.

The preferred method of crushing the metal-containing ore includes using a rock crusher and a ball crusher.

The preferred method of collecting a high purity metal at the end of the metal recovery process includes at least one of filtering, centrifuging, electrolysis, or use of a fluid bed extractor.

It is also preferred that the lixiviant of the present invention is revitalized and recycled to the mixer in a closed loop. In a batch process incorporating a leach field system, it is preferred that the lixiviant is diluted with water. When diluted, the preferred ratio of lixiviant to water is in a range of from approximately 10% to 99% lixiviant to approximately 1% to 90% water; more preferably, the ratio of lixiviant to water is approximately 40% to 60% lixivant to approximately 40% to 60% water to constitute a 100% liquid mixture.

The preferred metal recovery unit is selected from at least one of a filter, centrifuge, electrolysis unit, molecular sieve, and fluid bed extractor; more preferably, the metal recovery unit is an electrolysis unit.

It is also preferred that the metal recovery process of the present invention is conducted at ambient temperatures and pressures.

A preferred composition of matter that is used for extracting metal ions from a metal containing ore, prepared by the process of combining a high purity sulfuric acid with water and an ammonium compound, heating the mixture to approximately 140° F. to form mixture (I), placing mixture (I) in a pressurized vessel and heating the mixture to temperatures in a range between approximately 250 F. and 400 F., then, cooling the mixture, after the mixture is cooled, a stabilizing amount of the starting mixture (I) is added.

It is also preferred that the composition of matter of the present invention is a colorless, clear liquid used as a metal extractant in a concentration range of from 100% to 10% and when the concentration of said composition of matter is less than 100%, the remainder of the liquid is water; more preferably, the composition is 100% of the liquid used as a metal extractant, when extracting metal ions from a metal-containing ore, containing such metals as, copper, lead, molybdenum, cadmium, nickel, silver, cobalt, zinc, gold, platinum and aluminum.

Further objects and advantages of this invention will be apparent from the following detailed description of a presently preferred embodiment, which is illustrated in the accompanying drawings.

DESCRIPTION OF THE PREFERRED EMBODIMENT

Figure 1:
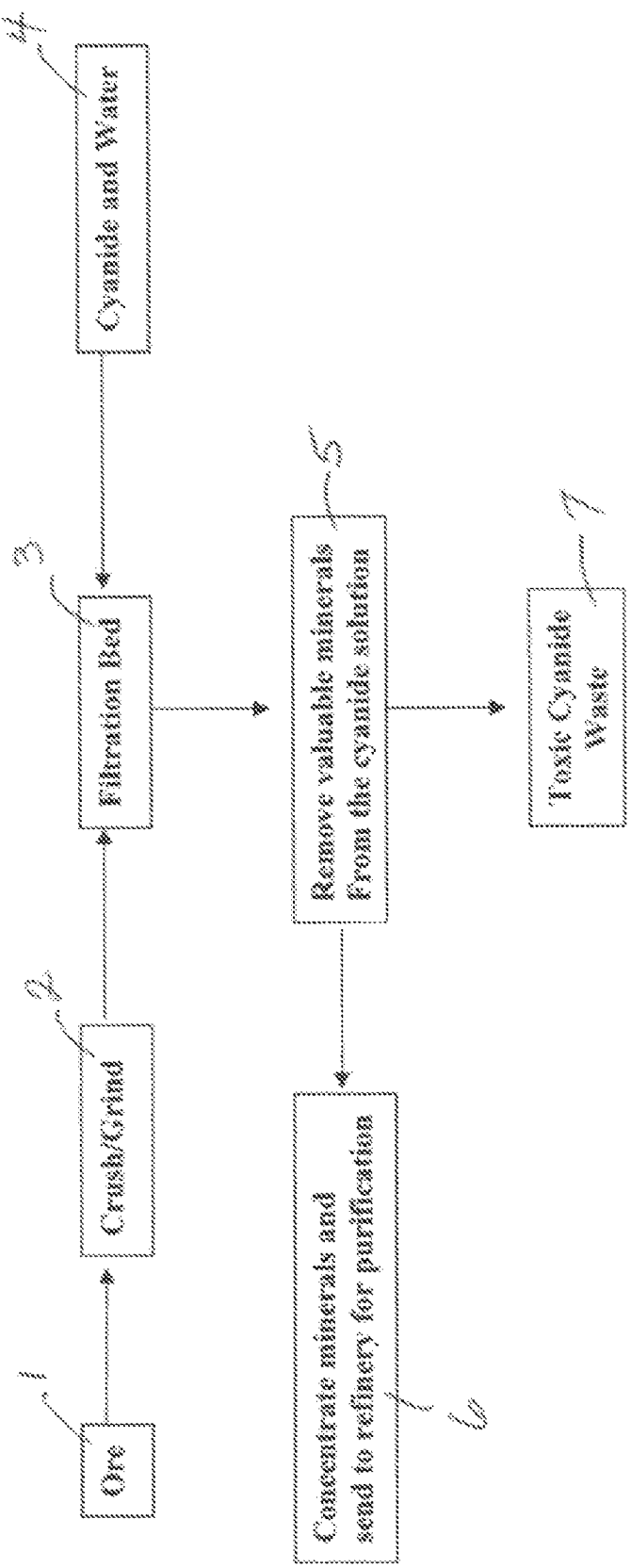
FIG. 1 is a schematic illustration of a traditional batch process using an aqueous cyanide solution to leach metals from metal-containing ores. (Prior Art)

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

It would be useful to discuss the meanings of some words used herein and their applications before discussing the compositions of matter and method of using in a novel metal extraction process.

"Lixiviant" is used herein to refer to a liquid medium used in hydrometallurgy to selectively extract the desired metal from an ore or mineral. The lixiviant assists in rapid and complete leaching or extracting. Metal is recovered from the lixiviant in a concentrated form after leaching.

"Metal recovery" is used herein to refer to recovery of precious metals, including gold, silver and the platinum group family, such as, iridium, palladium, rhodium, osmium, and ruthenium; other industrially useful metals including lead, copper, zinc, aluminum, chromium, cobalt, manganese and the rare-earth, alkali, and alkaline metals.

"LpHAC" is used to refer to a Low pH acidic composition—composition of matter claimed in U.S. Pat. Nos. 5,989, 595 and 6,242,001 B1 to Cummins and incorporated herein by reference.

In U.S. Pat. Nos. 5,989,595 and 6,242,011 B1 to Cummins, a low pH acidic composition of matter is disclosed that is useful for destroying microorganisms that spoil food, such as fish. The composition of matter, patented by Cummins, is also useful for skin treatment of melanoma and the treatment of other bacteria, and serves as the precursor for the novel metals recovery reagent of the present invention. LpHAC refers to the active metals recovery reagent or lixiviant in the present invention.

In general, the process for preparing LpHAC that is not an irritant or deleterious to humans includes combining a strong, low pH acid, selected from at least one of, 98% purity sulfuric acid, phosphoric acid, fumaric acid or acetic acid with water, preferably distilled water, deionized water, filtered water or the like and an ammonium compound to provide mixture (I), combining mixture (I) in a pressurized vessel and heating the mixture to temperatures in a range between approximately 250 F. and approximately 800 F., then cooling the mixture, after the mixture is cooled, a stabilizing amount of the starting mixture (I) is used. The ammonium compound is preferably anhydrous ammonia, ammonium sulfate, and buffered ammonium nitrate used in a ratio of approximately 1 lb. to approximately 5 lbs. of ammonium compound per gallon of water in mixture (I). A metallic sulfate, such as sodium sulfate, magnesium sulfate, zinc sulfate, manganese sulfate, and copper sulfate can be substituted for the ammonium compound in the process for making the LpHAC used herein as the key ingredient in a stuck pipe additive or drilling mud.

The following physical and chemical properties of the low pH acidic composition used in the present invention are observed when undiluted.

pH=−3; liquid color is clear; specific gravity is from approximately 1.4 to approximately 1.84.

Figure 2:
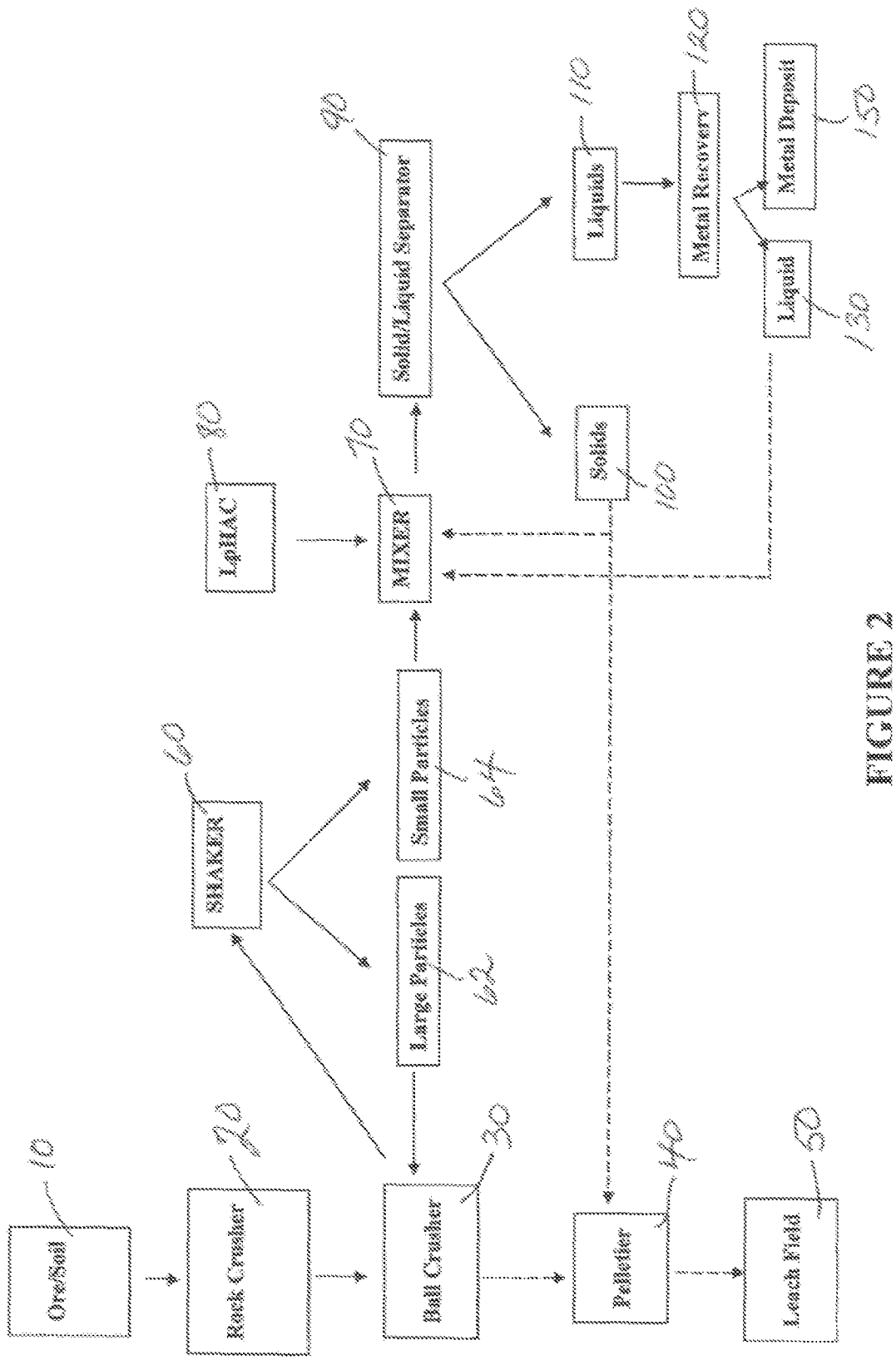
FIG. 2 is a flow chart of the present invention using a non-toxic, high strength, low pH acid composition to extract metals via metal chelation process in a continuous feed metal recovery system.
Figure 3:
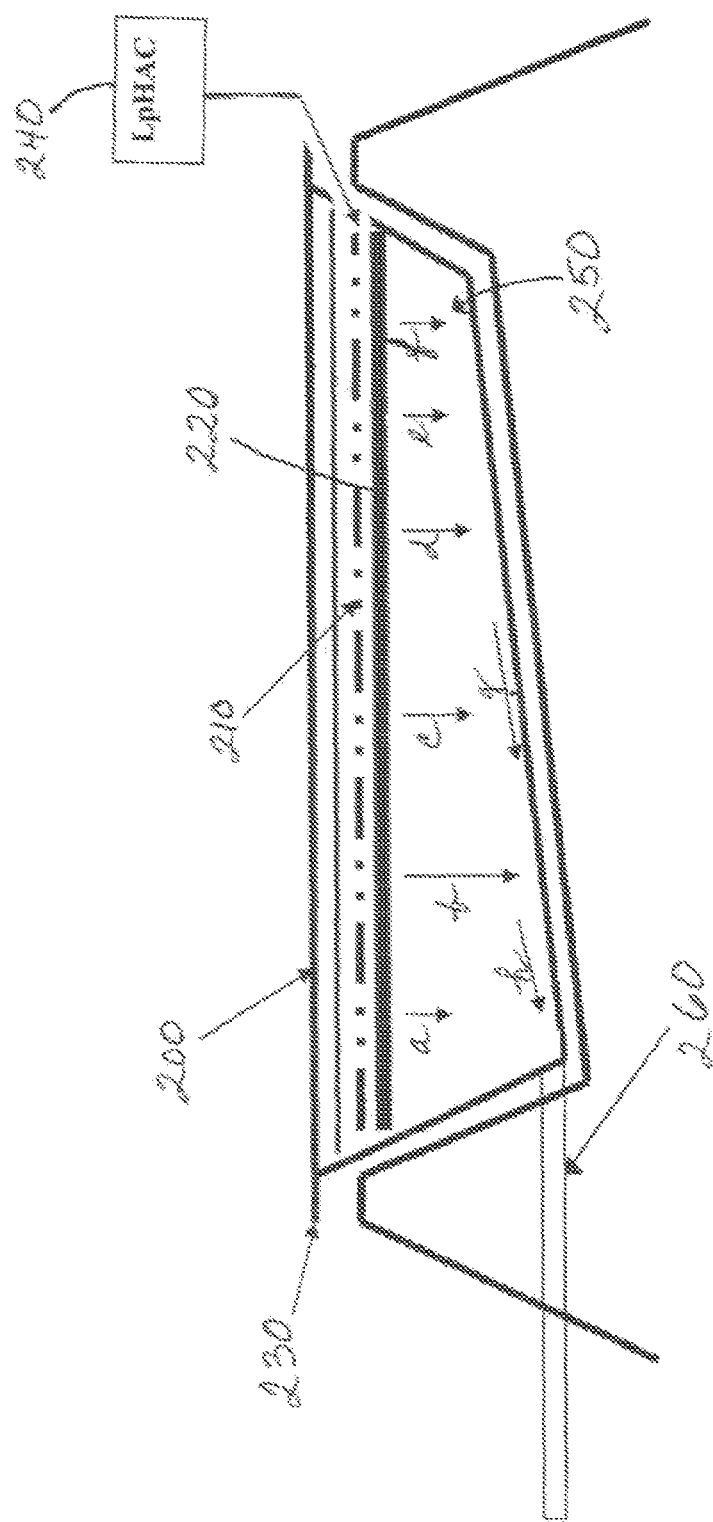
FIG. 3 is a flow chart of the present invention using an aqueous solution of a non-toxic, high strength, low pH acid composition to extract metals in a batch leach field system.

LpHAC is preferably used as an undiluted liquid in a continuous feed metal recovery process as shown in FIG. 2; however, for economical reasons and if using a batch extraction process as shown in FIG. 3, a diluted, aqueous solution of the LpHAC is recommended.

When diluted, the aqueous based fluid of the present invention may generally be composed of any water that is compatible with the extraction process. Preferably, the aqueous fluid is selected from the group comprising fresh water, sea water, brine, mixtures of water and non-toxic water soluble organic compounds, or mixtures thereof. The amount of the aqueous fluid of the present invention will vary, depending on the metals recovery application and the nature of the conditions of the metallic ore, soil or rock. Typically, the amount of the LpHAC may range from 100% of the extracting solution to less than 10% of the extracting solution by volume, with the remaining 90% to 0% of the solution being water.

As a metal extractant, LpHAC or the aqueous solution of LpHAC functions as a chelating agent removing the metal ions from the ore, soil or rock and forming a metal chelate compound or complex in an aqueous slurry. Further processing of the aqueous slurry of the metal chelate compound in an electrolytic fluid carrier extracts the metal using an opposing charged depositing device or metal plate. This extraction process provides a recovery rate of more than 75% recovery of a high purity metal directly from metal laden soil and rock using non-corrosive, non-caustic, non-toxic materials with no harm to workers or the environment.

FIG. 1 shows a prior art batch process for recovering valuable minerals, such as, gold using and aqueous cyanide solution 4 to leach gold from an ore 1 that is crushed and/or ground 2 before it is conveyed to a filtration bed 3 consisting of a vault of pelletized fly ash (ground metal ore) containing gold. The cyanide solution 4 extracts the gold from the ore and from which the valuable minerals (gold) are removed 5. The mineral extract is concentrated and refined for purification 6 and a toxic cyanide waste 7 is left for disposal and further handling to prevent damage to the environment. This process has a recovery rate between approximately 32% to approximately 37%, with many negative environmental and health impacts due to the use of cyanide and caustic materials.

The use of cyanide in processing also generates significant amounts of cyanide by-products that take time to degrade, notably cyanate and thiocyanate, and metal complexes of cyanide. The exact toxicities, residence time, and impacts on aquatic organisms are still poorly understood. It is common for regulatory agencies to omit monitoring for these compounds in the discharges from mines, partially because there is so little known about them.

Most people know of cyanide as a dangerous, lethal chemical, and, without a doubt it can be dangerous if it is not treated appropriately. Humans can be subjected to the effects of cyanide via ingestion, inhalation, or absorption through the skin. In essence, upon intake of the cyanide, cellular asphyxiation occurs via binding of the iron in the cytochrome C oxidase enzyme. With the iron bound up by the cyanide, the human body cannot property utilize oxygen, the individual actually suffocates from oxygen starvation. Cyanide levels in the tailings (discharged waste) pond should be reduced to 50 milligrams per liter or less to avoid wildlife mortalities. Cyanide levels above 100 milligrams/liter can cause bird and other wildlife mortalities.

In FIG. 2, the continuous feed extraction process of the present invention is illustrated in a flow chart. Soil or rock containing metallic ore 10 is crushed in a rock crusher 20, then ball milled in a ball crusher 30 to form a micron sized particles in a range of approximately 10 microns to approximately 500 microns in size and resembling a coarse powder. From the ball crusher 30, the coarse powder may be directed to a pelletizer 40 to from pellets useful in a batch extraction process connected to a leach field 50. The batch process is shown in FIG. 3 and will be discussed in more detail below.

For the continuous feed extraction process, the coarse powder from the ball crusher 30 is conveyed to a shaker 60. The shaker 60 is a sizing unit which channels the larger size ore particles 62 back to the ball crusher 30 to be resized to a smaller particle size while the acceptably smaller sized particles 64 from the shaker 60 are conveyed to a mixer 70. Those skilled in the art are aware that particle size can vary according to the type of metal and mineral composition of the ore. A large particle size that is returned for additional grinding is in a size range of approximately 500 microns in diameter or larger and the small particle size that is acceptable for further processing in the mixer 70 is in a range of from approximately 10 microns to approximately 500 microns in diameter.

The mixer 70 can be a vat or high speed mixing tank that produces a liquid/ore slurry with the addition of a lixiviant, which in the present invention is, LpHAC 80. LpHAC 80 is a liquid and can be used full strength or in an aqueous solution. The LpHAC forms the liquid phase of the process.

The quantity of LpHAC 80 added to the mixer 70 is preferably to a point where the liquid phase is 30% above field saturation, thus forming a slurry. The slurry contains a very fine flour of micron-sized metal particles that is subsequently fed to a solid/liquid separator 90. After passing through the solid/liquid separator 90, all solids 100 are removed and transported back to the mixer 70 or to the pelletizer 40 for further processing. The remaining liquid 110 contains LpHAC and chelated metal in solution and is known as the pregnant solution. The pregnant solution with chelated metal is treated by conventional methods known to those skilled in the art to recover the metal. For example, the pregnant liquid 110 can be filtered, centrifuged, or directed to an electrolytic unit with an oppositely charged depositing device or metal plate.

If filters are used to recover the metal from the pregnant liquid, the filters could be made of paper, zinc, ceramic materials, or any other type of filter known by those skilled in the art. The recovered metal is further refined and smelted by known processes.

When using an electrolytic unit to recover metal from the pregnant liquid, an opposing charge is usually placed on the plates. The pregnant liquid of the present invention is has a very high positive charge due to the high amount of hydrogen protons available in the solution. Although, the efficacy of the LpHAC liquid in extracting metals from an ore is not to be bound by any scientific explanation as to the reason for the superior results, it is thought that the high amount of hydrogen protons are effective in removing the metal from the ore, the greater the H+ count the more metal can be removed from the ore in it's ionic form, as metal ions.

The metals in the solution are deposited on the plate when an electric charge is applied to the solution. Subsequently, the metals deposited on the charged plate are rinsed to yield a metal sludge which is dried and put into a furnace for smelting. After several hours, the molten material is poured into a cascade of moulds producing bars of high purity metal.

Because metal deposition rates are related to available surface area, maintaining properly working cathodes is important. Two cathode types exist, flat-plate and reticulated cathodes, each with its own advantages. Flat-plate cathodes can be cleaned and reused, and plated metals recovered. Reticulated cathodes have a much higher deposition rate, compared to flat-plate cathodes because of the larger surface area of the reticulated plate. However, reticulated cathodes are not reusable and must be sent off for recycling.

FIG. 3 shows the leach field section of the batch process for metal recovery. Referring to FIG. 2 for the first steps of the process, soil or rock containing metallic ore 10 is crushed in a rock crusher 20, then ball milled in a ball crusher 30 to form a micron sized particles in a range of approximately 10 microns to approximately 500 microns in size and resembling a coarse powder. From the ball crusher 30, the coarse powder may be directed to a pelletizer 40 to from pellets useful in a batch extraction process connected to a leach field 50. A leach field collection system shown in FIG. 3 has an environmental protection barrier 200 covering a perforated pipe 210 placed over a bed of pelletized metal containing ore 220 contained in a bed with a leak proof liner 230. The lixiviant, LpHAC 240 is directed into the perforated pipe 210, the liquid saturates the pellet bed and extracts the metals contained in the pellets and becomes a pregnant liquid that drips in the direction of arrows a, b, c, d, e, f onto the leak proof liner 230. The pregnant liquid 250 moves in the direction of arrows x, y and goes into fluid collection pipe 260. The pregnant liquid 250 containing fluid and ionized metal is transported to separation/collection units for further processing similar to the pregnant liquid 110 is processed above. For example, in electrowinning, when an electric charge is applied to the pregnant liquid 110 and 250 containing a chelated gold complex, gold is deposited onto a charged plate at a very high rate. A fluid bed could also be used as the depositing device.

EXAMPLE 1

Gold Extraction

Virgin ore sample from an unknown location in the western United States was divided into three samples of equivalent size. The letter that accompanied the ore stated that the sample was uncontaminated as far as it was known. The sample was identified as E-C4 and assayed by Metallurgical Laboratory, Inc., at 125 Manuel St., Reno, Nev. 89502. The Metallurgical Research & Assay Lab in Las Vegas showed a reading by Inductively Coupled Plasma (ICP) analysis of 0.3 ounces of gold (Au) per ton of ore.

Upon observation of the ore, it was noted that a quartz rock was the major component of the sample matrix with an undetermined amount and type of rocks and clays. The sample was crushed to a size of approximately 1 to 10 micron in diameter and mixed to a homogenous state. Great care was used to prevent contamination during this step. Individual samples were labeled. The sample A-1 was used as a control for Quality Assurance of analysis; samples A-2 and A-3 were treated with the LpHAC lixiviant to a point of 30% above field saturation, to form a slurry. The slurry was processed in a solid/liquid separator and the solid material reserved for further processing while the liquid was treated with a predetermined charge of electrical current. Different reactions were noticed as the LpHAC was excited at different levels. The probes were covered with mineral deposits. The lixiviant treated soil samples were then placed in clean, sealed sample containers and labeled as A-2 and A-3. A control sample, labeled A-1, was collected at the same time and from the same batch to act as a control. Table I below shows the results of gold extraction.

TABLE I

EXTRACTION OF GOLD

| Sample ID | Lab No. | Lixiviant | Gold Content | % Recovery | % RPD |
|---|---|---|---|---|---|
| A-1 | E-3440-1 | None | 0.45 | Control | 2.58 |
| A-2 | E-3440-2 | LpHAC | ≦0.10 | 96% | 2.58 |
| A-3 | E-3440-3 | LpHAC | ≦0.10 | 96% | 2.58 |

The initial assay by the Metallurgical Research & Assay Lab in Las Vegas, Nev. determined that the ore contained low levels of gold. When extracted, the low levels made it difficult to visibly observe the quantity of gold recovered. It was determined that to correctly demonstrate the treatment process, the best way was to analyze for the remaining volume of gold in the treated samples. This approach allowed for a positive and accurate measure of the amount that was removed from the soils during the treatment process as shown in Table I above.

Table I shows that the extraction was complete as shown by samples A-2 and A-3. The detection limits of an ICP test is ≦0.10 ppm (mg/Kg), which translates that any amount below or less than ≦0.10 ppm is classified as clean or non-detectable. Sample A-1 was used as a low limit volume control point for gold detection. Sample A-1 contained 0.45 ppm of gold and was the baseline for the testing; it was also a volume sample of the ore from the same batch as the treated samples (A-2 and A-3). It was also used to identify any tungsten mineral that may be present that could interfere with the ICP analysis. Tungsten would show up during the ICP as a high volume of gold. This did not occur and therefore, tungsten was not considered as a contaminating factor within the results found.

The samples A-2 and A-3 were treated as separate individual treatments which demonstrated that the treatment for recovery/removal of gold is consistent. Both A-2 and A-3 sample results were below detection limits, which demonstrated the complete recovery of gold from the ore in the treatment process.

Testing also included a Ratio of Percent Deviation (RPD) factor which allows for interpreting the worse case results. Based on the A-1 sample (control) and A-2 and A-3 treated samples, results show the process recovered/removed 77% of the gold as a worse case scenario, with ≦0.10 mg/Kg as being non-detectable. In reality, it was greater than 77% because the detection limits of the ICP test could not go lower. Analysis of percentage of gold recovery with the lab results re-stated using the assay lab report in Las Vegas, Nev., (0.03 oz per ton) would yield a 98.9% recovery ratio. Thus, recovery of gold using LpHAC as the lixiviant is between 77%, on a worse case scenario, with the upper limits in the 90 to 98 percent range.

Further, when focusing on the recovered gold; the gold is washed from the electrically charged plates and analyzed. The highly electrolytic positive charge of the LpHAC remained stable at temperatures over 258° F. and there is no damage to living tissue, even in a full concentrated form. The gold tested for a purity of 99.99%.

The process of the invention can clearly be refined to increase the recovery rate to a range between approximately 86% to approximately 97% with a very low to no environmental and health impact. In contrast, the recovery rate in known processes, as described in FIG. 1 have extraction rates of less than 40%, with hazardous and deleterious effects on environment and health of workers.

By extrapolating the results of the laboratory test, it is determined that approximately two to three tons of ore laden soil can be processed per hour in the continuous process described above. Whereas, the batch process of the prior art processes approximately one fourth of a ton of ore laden material per hour.

The ability of the low pH acidic composition to extract a metal in its ionic form is quite impressive. Another way of describing the process is to call it a low pH fluidized Reaction Extraction. The low pH composition is mixed with an ore laden soil and carriers the metal in its ionic form in a fluidized state until deposited on an oppositely charged plate or until fluid movement stops and conventional separation techniques are applied to the pregnant liquid. The present metals recovery process is very effective and safe to personnel and the environment. This commercially viable process is suitable for helping the metallurgical industry say "Say-o-nara to cy-a-nide."

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A composition of matter for extracting metal ions from a metal containing ore, consisting essentially of:
    a) a product prepared by the process of combining a high purity acid selected from at least one of phosphoric acid, fumaric acid or acetic acid with water selected from at least one of deionized water and filtered water and an ammonium compound selected from at least one of anhydrous ammonia and buffered ammonium nitrate used in a ratio of approximately 1 lb. to approximately 5 lbs. of ammonium compound per gallon of water, heating the mixture to approximately 140° F. to form mixture (I), placing mixture (I) in a pressurized vessel and heating the mixture to temperatures in a range between approximately 250 F. and approximately 400 F., then, cooling the mixture, and after the mixture is cooled, adding a stabilizing amount of the starting mixture (I) forming a low PH acid (LpHAC) product that is not an irritant; and
    b) water selected from the group consisting of fresh water, sea water, brine, and a mixture thereof is combined with the product from a) to form an aqueous metal extracting solution that extracts metal ions from a metal-laden ore in soil and rock at a recovery rate between approximately 75% and 98% of total metal in the ore.

2. The composition of matter of claim 1, wherein the mixing ratio of water to low pH acid (LpHAC) product is in a range between approximately 1% to 90% water to approximately 10 to 99% LpHAC product.

3. A composition of matter for extracting metal ions from a metal containing ore, consisting essentially of:
    a product prepared by the process of combining a high purity acid selected from at least one of phosphoric acid, fumaric acid or acetic acid with water selected from at least one of deionized water and filtered water and an ammonium compound selected from at least one of anhydrous ammonia and buffered ammonium nitrate used in a ratio of approximately 1 lb. to approximately 5 lbs, of ammonium compound per gallon of water, heating the mixture to approximately 140° F. to form mixture (I), placing mixture (I) in a pressurized vessel and heating the mixture to temperatures in a range between approximately 250 F. and approximately 400 F., then, cooling the mixture, and after the mixture is cooled, adding a stabilizing amount of the starting mixture (I) forming a low PH acid (LpHAC) product that extracts metal ions from a metal-laden ore in soil and rock at a recovery rate between approximately 75% and 98% of total metal in the ore.

4. The composition of matter of claim 3, wherein the composition is 100% of the liquid, low pH acid (LpHAC) product which extracts metal ions from a metal-laden ore in soil and rock at a recovery rate between approximately 75% and 98% of total metal in the ore.

* * * * *